F. A. WILKINSON.
INTERNAL COMBUSTION ENGINE.
APPLICATION FILED AUG. 9, 1916.

1,224,254.

Patented May 1, 1917.
2 SHEETS—SHEET 1.

Francis Alan Wilkinson
Inventor
by Lawrence Langner
Attorney.

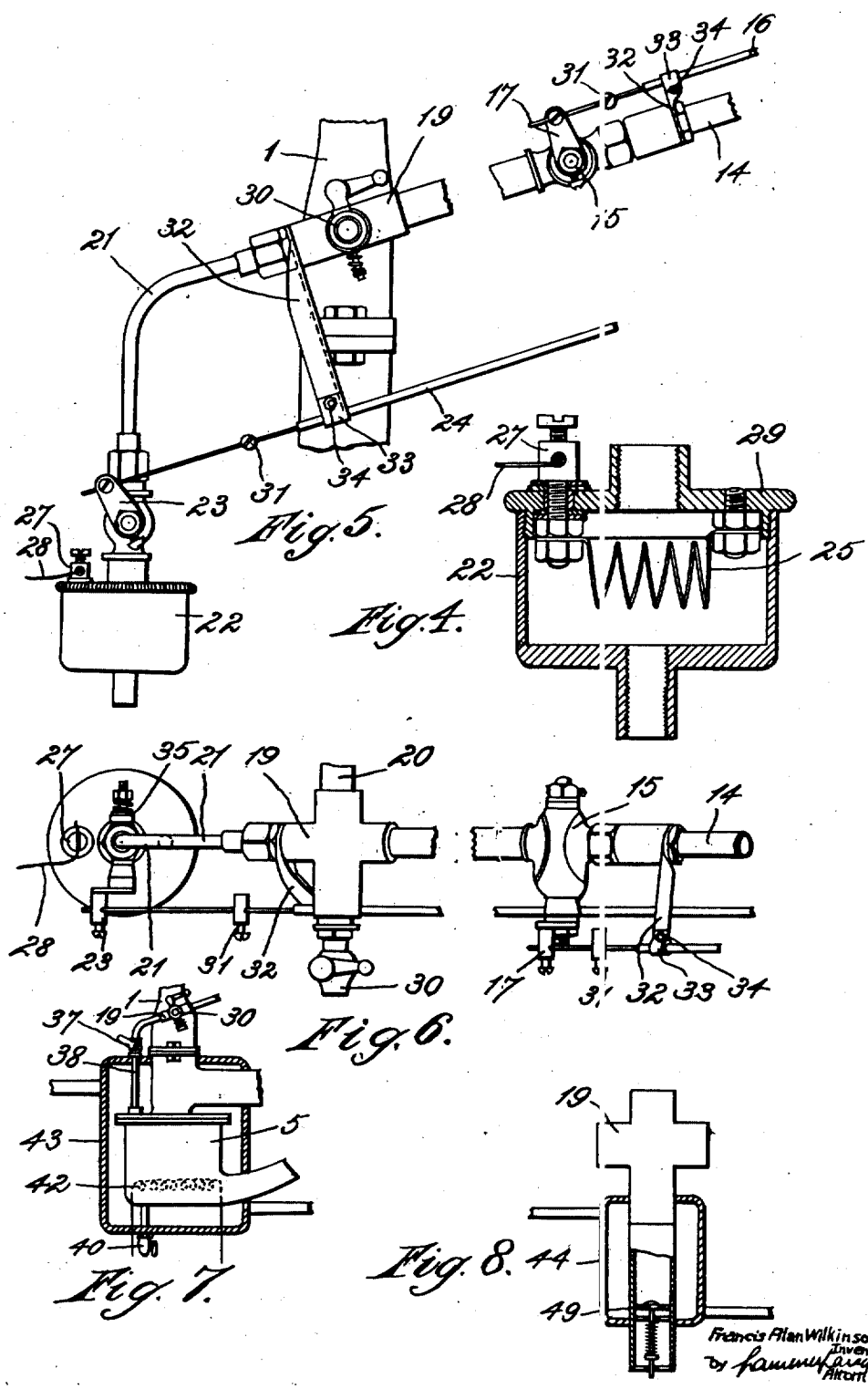

UNITED STATES PATENT OFFICE.

FRANCIS ALAN WILKINSON, OF HATFIELD, ENGLAND.

INTERNAL-COMBUSTION ENGINE.

1,224,254.     Specification of Letters Patent.     Patented May 1, 1917.

Application filed August 9, 1916. Serial No. 13,916.

*To all whom it may concern:*

Be it known that I, FRANCIS ALAN WILKINSON, a subject of the King of Great Britain, and resident of The Meadows, Hatfield, in the county of Hertford, England, have invented certain new and useful Improvements Relating to Internal-Combustion Engines, of which the following is a specification.

This invention has for its object to provide a convenient and simple method of and apparatus for using relatively crude or heavy oils as fuel in internal combustion engines for motor cars, motor boats, aeroplanes and so forth.

One object of the invention is to enable an engine designed to work with light motor spirit such as petrol, to be modified with but small expense or alteration so as to work with oils such as crude petroleum or kerosene.

A further object is to provide for the starting of the engine with the kerosene or the like by the use of external heat such as can be provided by a heating coil supplied with electric current from a battery.

Another object is to provide for the supply of some of the fuel directly to the induction pipe leading to the inlet valves of the engine when this is required as in re-starting after a short stop or slowing down, but while the engine is still warm.

The manner in which these and other objects are attained will be apparent from the following description with reference to the accompanying drawings which illustrate one embodiment of the invention as applied to the engine of a motor road vehicle.

Figure 1:
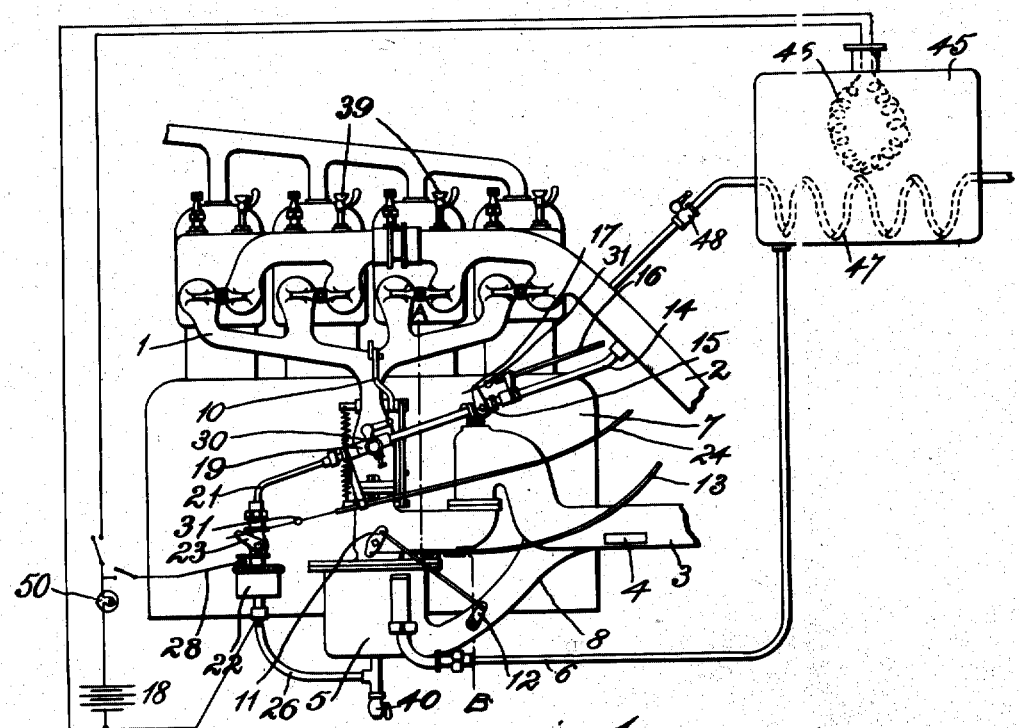
Figures 2, 3:
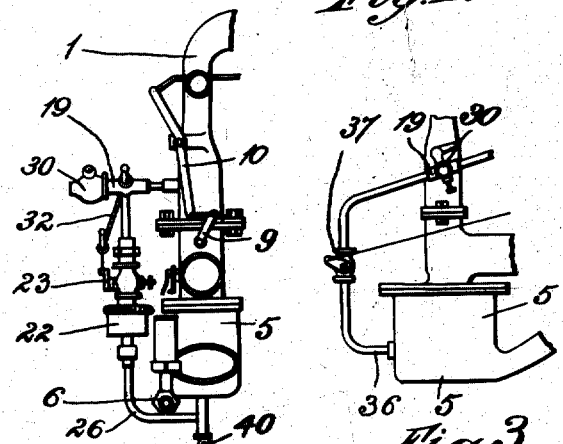

In the drawings:—Figure 1 is a general view in side elevation of an engine modified according to the present invention; Fig. 2 shows an end view of a portion of the apparatus in section on the line A—B of Fig. 1; Fig. 3 is a detail view showing a modification; Fig. 4 shows to a larger scale the electric heating vessel; Fig. 5 is an elevation, and Fig. 6 a plan view, showing to a larger scale the fitting connected to the induction pipe of the engine; Figs. 7 and 8 are detail views illustrating a jacketed carbureter and a jacketed air inlet respectively.

The invention is shown in Fig. 1 as applied to a four-cylinder engine of a well-known type. 1 is the induction pipe conveying the mixture to the inlet valves of the several cylinders, and 2 is the exhaust pipe leading away from the exhaust valves of the cylinders. 3 is the air pipe which is generally arranged with its principal inlet around the exhaust pipe so that the air will be somewhat heated where it is drawn in, while there may be an auxiliary inlet for cold air as indicated at 4. 5 is the float chamber of the carbureter receiving liquid fuel through a pipe 6 from a tank 45 in the usual manner. In the normal working of the engine some of the air is drawn from the pipe 3 through a section 7 containing a spring-controlled valve, while another portion passes through a branch pipe 8 to the carbureter, and the mixture of air and fuel passes to the engine cylinders through the induction pipe 1. The usual throttle valve is provided in the induction pipe controlled by an arm 9 and pivoted lever 10. In order to control the proportion of air passing directly and through the branch 8 to the induction pipe, other throttle valves, the stems of which are indicated at 11 and 12 in Fig. 1, may be provided, these being interconnected as shown and controlled simultaneously by a wire passing through a metal tube 13.

In adapting such an engine for working with kerosene the construction is modified as follows. In the exhaust pipe 2 a hole is made and a small pipe 14 is fitted with its end projecting therein so as to take in a small proportion of the gases passing through the pipe 2. A valve is provided at 15 in the pipe 14 for controlling the flow of the exhaust gases therethrough, the valve being manipulated for instance by a wire passing through a tube 16 and engaging with an arm 17 on the valve stem. The pipe 14 leads into a cross-piece 19 best seen in Fig. 6. One branch of this cross-piece marked 20 in Fig. 6 leads into the induction pipe 1, and when the valve 15 is opened it admits some exhaust gases through the pipe 14 into the induction pipe 1. Another branch communicates through a pipe 21 with a vessel 22 shown to a larger scale in Fig. 4. A valve having an arm 23 controlled by a wire passing through a tube 24, cuts off or opens communication between the vessel 22 and the pipe 21 as required. The spring 35 holds the valve tightly upon its seating. In the vessel 22 is an electric heating coil 25 made for instance of Nicrome wire and adapted to heat the kerosene in the said vessel. Such a coil can readily be made to effect the required heating when supplied with current at say 6 or 12 volts from a battery. The vessel 22 communicates at the bottom through a pipe 26 with the bottom of the float chamber 5, so that the kerosene normally rises in the vessel 22 to the same level as that in the float chamber 5, for instance so as just to cover the heater coil 25. A wire 28 leads from the battery 18 to an insulated terminal 27 connected to one end of the coil 25. The other end of said coil is connected to the cover 29 of the vessel 22, and this is connected through its attachments to the frame of the vehicle which constitutes the return to the battery, although of course a separate metallic return circuit may be provided if preferred.

The remaining branch of the cross-piece shown in Fig. 6 has a valve or cock 30 upon it which when opened communicates with the air in order to provide for the admission of additional air with the exhaust gases through the cross-piece into the induction pipe. In place of an adjustable air valve as above described, an automatic valve 49, Fig. 8, may be used which is normally drawn toward its seat by a spring, the suction of the engine then automatically governing the opening of the valve and the admission of air.

The control wires carried through the metal tubes 13, 16 and 24 are connected as usual to control buttons or levers on the dashboard of the car, and at the other end are connected to the valve levers as shown. Stops 31 on the wires prevent them from being pulled back far enough for the valve levers to be pulled over the dead center position. The tubes are conveniently supported as is shown for example for the tubes 16, 24 in Figs. 5 and 6 by means of bent metal pieces 32 clamped at one end to the pipes attached to the cross-piece, and having their other ends 33 bent around the said tubes and secured by small bolts and nuts 34. The bent metal pieces 32 are made L-shaped or channel-shaped in section in their middle portions so as to be rigid enough to support the tubes 16 and 24 securely, and they provide a convenient method of supporting the same without any additional attachments or fittings, beyond what are necessary to attach the cross-piece 19 to a socket on the induction pipe 1.

The apparatus above described operates in the following manner. When the engine is cold and it is required to start it, the valve 15 is closed if this is found necessary, and the current is switched on from the battery 18 on the car, and passing through the resistance wire 25 it heats the kerosene in the vessel 22. If the battery is only such as is provided for lighting purposes on motor cars, three or four minutes may be required for the heating operation with the current available, but if it is a larger battery such as is usually provided to operate an electric starter, the preliminary heating can be done more quickly. As soon as the kerosene in the vessel 22 is sufficiently heated, the engine can be cranked up so that the pressure in the induction pipe is reduced, and the valve in the pipe 21 being open some hot kerosene will be drawn up the said pipe and mixed with air coming from the carbureter, and also with air entering through the valve 30 if it is opened. The mixture thus formed will ignite in the cylinders and the engine will start up without further trouble. As soon as the kerosene is hot the electric heater coil 25 may be cut out of circuit, and the engine may be started; the valve in the pipe 21 may be closed, after which a combustible mixture will be made with kerosene in the carbureter, and this mixture passing through the induction pipe 1 to the cylinders will be heated by exhaust gases coming through the pipe 14, and diffusing into the said mixture, so raising its temperature to that at which it will be readily combustible in the cylinders. The admission of some air through the valve 30 is important, as unless some air is admitted at this point the combustion is liable to be incomplete, at any rate with some types of engines. The adjustment of the valve 30 enables the admission of auxiliary air at this point to be controlled until the best results are attained for any particular car, and until the exhaust is practically invisible, combustion being as complete as possible. For some cars however, the use of the auxiliary air valve 30 may not be necessary, and if it is fitted it may be kept closed. It is advisable however, that it should be provided in all cases in order to permit of the control of the mixture by admitting further air at this point whenever it proves to be necessary. The valve 30 may be operated through a control wire if desired, but this is not usually necessary as the valve can be set by hand in a position which will suit the car under most circumstances, and the adjustment will not need disturbing as a rule. The electric heater for starting is not necessarily arranged in a separate vessel 22 as shown, but it may be inside the float chamber 5, or in a socket member attached to the said vessel. In Fig. 3 a modification is shown in which it is assumed that the electric heater 42 is contained in the float chamber 5 and in this case a branch pipe 36 which may lead out of the chamber from below the liquid level therein, is carried up past a valve 37 and to the cross-piece 19 so that heated kerosene is passed directly from the float chamber to the fitting on the induction pipe when required at starting. The pipe 36 need not necessarily lead out from below the liquid level in the float chamber, but it may lead out from the top thereof as indicated at 38, Fig. 7, because although the liquid is not normally up to the level of the top of the chamber, yet when the suction of the engine is applied, the level of the liquid rises and it is drawn up to the outlet at the top. The same action occurs in the case of the vessel 22 shown in Fig. 4, the outlet from which is at the top. Experimental use of the apparatus has shown that it is desirable also to have the possibility of drawing up kerosene into the inlet pipe at any time during running if the engine should be slowed up, or if it is started again after a short stop when it has only partially cooled, and the connection 36 is useful for this purpose even if there is no electric heater in the float chamber, as by opening the valve 37 more fuel is enabled to reach the engine through pipe 36, than could reach it through the jet of the carbureter.

The carbureter may be made as shown in Fig. 7, with a jacket 43 heated by exhaust gases or hot water from the engine in the well known way and the air admitted to the fitting 19 may also be heated by an exhaust jacket 44 or otherwise if desired as indicated in Fig. 8. Kerosene as sold for burning purposes varies a good deal in specific gravity, according to its source and treatment, and for some of the heavier varieties it may be desirable to heat the kerosene before it reaches the carbureter. It is well known how to do this by an exhaust jacket or by carrying the pipe leading the fuel to the carbureter through or around a portion of the exhaust pipe, or by heating the paraffin in the supply tank by electrical or other means. For instance, in Fig. 1, the dotted lines 46 indicate an electric heating coil in the tank 45, while dotted lines 47 indicate a coil through which some exhaust gases can be passed, the flow being controlled by a cock 48.

If an electric heater is not available, the engine can be started in various ways. It is well known for example to use a blow-lamp flame or the like for heating up the vaporizer or the induction pipe of an engine before starting when kerosene is used, and if a blow-lamp is to be employed in the present case for starting purposes it will preferably be used to heat the cross-piece 19. If this is to be done the cross-piece may be inclosed in a suitable casing lined with asbestos if required and provided with an opening to admit the flame of the lamp. Again, there are various other possible ways of starting, for instance by priming the cylinders with petrol or the like through the cups 39 on the top thereof, or by draining the carbureter through the pet-cock 40 which is usually provided, and filling it with petrol for starting purposes. It is most convenient however to employ kerosene only and to have an electric heater for starting purposes as already described.

The heater shown in Fig. 4 is conveniently arranged so that the coil is readily accessible when required, the cover 29 being screwed into the vessel 22 and the coil being attached to terminals on the cover. It will be apparent however, that the heater coil might be arranged in other ways to serve the same purpose. With the electric heater may be used any known or suitable device which will act as an automatic cut-off when the temperature rises sufficiently so that it shall not be possible to waste electric energy in the heater after the engine has been started and is running normally. Various devices are known for similar purposes, operated by thermostats for example, and they will need no description here. Probably a small lamp 50, Fig. 1, in the circuit from the battery to the heater, indicating to the driver when the heater is in use, would be all that is necessary to prevent a mistake of this character being made.

Although kerosene has been principally referred to as the fuel which is to be used, it will be understood that heavy oil fuels may be employed if they are heated in a preliminary operation; and where kerosene is referred to in this specification, it is therefore to be understood that the term is used to include various other substances of a like nature which cannot normally be used in an internal combustion engine without some special provision for heating.

Having thus described my invention what I claim as new and desire to secure by Letters Patent is:—

1. The combination with an internal combustion engine having a carbureter, a float chamber for supplying fuel thereto, an induction pipe leading to the inlets of the cylinders, and an exhaust pipe leading away from the outlets of the cylinders, of a fitting communicating with the induction pipe between the carbureter and the inlets of the cylinders, a by-pass pipe leading from the exhaust pipe to such fitting, and means for conveying fuel from said float chamber to said fitting, and means for controlling such flow.

2. The combination with an internal combustion engine having a carbureter, a float chamber for supplying fuel thereto, an induction pipe leading to the inlets of the cylinders, and an exhaust pipe leading away from the outlets of the cylinders, of a fitting communicating with the induction pipe between the carbureter and the inlets of the cylinders, a by-pass pipe leading from the exhaust pipe to such fitting, means for conveying fuel from said float chamber to said fitting, and means for heating the fuel before it reaches the said fitting.

3. The combination with an internal combustion engine having a carbureter, a float chamber for supplying fuel thereto, an induction pipe leading to the inlets of the cylinders, and an exhaust pipe leading away from the outlets of the cylinders, of a fitting communicating with the induction pipe between the carbureter and the inlets of the cylinders, a by-pass pipe leading from the exhaust pipe to such fitting, a pipe leading from the float chamber, a vessel with which said pipe communicates, an electric heating coil in said vessel, a pipe leading out from said vessel to said fitting, and means for controlling the flow of the fuel through said pipe to the fitting.

4. A fitting applicable to internal combustion engines for facilitating the use of heavy fuels therein, said fitting comprising a cross-piece one branch of which is adapted to be attached to the induction pipe of the engine, a pipe and a valve therein communicating with a second branch of the cross-piece, said pipe being adapted to communicate with the exhaust pipe of an engine, another pipe communicating with a third branch of the cross-piece, a chamber in said pipe, means for supplying fuel thereto, means for heating the same, and a valve for controlling the flow of fuel therethrough.

5. A fitting applicable to internal combustion engines for facilitating the use of heavy fuels therein, said fitting comprising a cross-piece one branch of which is adapted to be attached to the induction pipe of the engine, a pipe and a valve therein communicating with a second branch of the cross-piece, said pipe being adapted to communicate with the exhaust pipe of an engine, another pipe communicating with a third branch of the cross-piece, a chamber in said pipe, means for supplying fuel thereto, means for heating the same, and a valve for controlling the flow of fuel therethrough, and an air inlet and valve communicating with the fourth branch of said cross-piece, all substantially as and for the purpose set forth.

6. A fitting applicable to internal combustion engines for facilitating the use of heavy fuels therein, said fitting comprising a cross-piece one branch of which is adapted to be attached to the induction pipe of the engine, a pipe and a valve therein communicating with a second branch of the cross-piece, said pipe being adapted to communicate with the exhaust pipe of an engine, another pipe communicating with a third branch of the cross-piece, a chamber in said pipe, means for supplying fuel thereto, means for heating the same, and a valve for controlling the flow of fuel therethrough, and means for controlling said valves, consisting of wires connected to the valves, tubes through which said wires pass, and brackets clamped to said pipes and supporting the ends of said tubes.

FRANCIS ALAN WILKINSON.